(12) United States Patent
Frantzen et al.

(10) Patent No.: US 10,807,672 B2
(45) Date of Patent: Oct. 20, 2020

(54) BICYCLE (71) Applicant: Technische Hochschule Köln, Cologne (DE)

(72) Inventors: Michael Frantzen, Aachen (DE); Janke Mansel, Gangelt (DE); Jens Opitz, Lindlar (DE); Felix Vreden, Cologne (DE)

(73) Assignee: TECHNISCHE HOCHSCHULE KOELN, Cologne (DE)

( * ) Notice: Subject to any disclaimer, the term of this patent is extended or adjusted under 35 U.S.C. 154(b) by 173 days.

(21) Appl. No.: 16/075,936

(22) PCT Filed: Feb. 17, 2017

(86) PCT No.: PCT/EP2017/000232
§ 371 (c)(1),
(2) Date: Aug. 6, 2018

(87) PCT Pub. No.: WO2017/140433
PCT Pub. Date: Aug. 24, 2017

(65) Prior Publication Data
US 2019/0061861 A1 Feb. 28, 2019

(30) Foreign Application Priority Data
Feb. 18, 2016 (DE) .......................... 10 2016 001 843

(51) Int. Cl.
*B62K 11/12* (2006.01)
*B62K 19/32* (2006.01)
(Continued)

(52) U.S. Cl.
CPC ............... *B62K 11/12* (2013.01); *B62J 25/00* (2013.01); *B62K 3/002* (2013.01); *B62K 19/32* (2013.01);
(Continued)

(58) Field of Classification Search
CPC ........ B62K 11/12; B62K 3/002; B62K 19/32; B62K 21/00; B62K 21/02; B62K 23/02
See application file for complete search history.

(56) References Cited

U.S. PATENT DOCUMENTS 602,034 A 4/1898 Murphy
3,620,547 A * 11/1971 Vaverek ................. B62K 3/002
280/87.042

(Continued)

FOREIGN PATENT DOCUMENTS

DE 102006019290 A 10/2007

*Primary Examiner* — Tony H Winner
(74) *Attorney, Agent, or Firm* — Andrew Wilford (57) ABSTRACT The invention relates to a bicycle having a frame (1) comprising a front head tube (3) that defines a front steering axle (13) and on which a front fork steerer tube (5) having a front wheel fork (7) that receives a front wheel (8), and a steering link (15) on which a handlebar (11) is arranged, is rotatably mounted, and a rear head tube (4) that defines a rear steering axle (14) and on which a rear fork steerer tube (6) having a rear wheel fork (9) that receives a rear wheel (10) is rotatably mounted, wherein the rear fork steerer tube is connected to the front fork steerer tube (5) via a coupling arrangement (12) and is rotatable in dependence of the rotation angle of the front fork steerer tube (5) and the front steering axle (13) and the rear steering axle (14) are inclined toward each other and intersect underneath the handlebar (16).

23 Claims, 2 Drawing Sheets (51) Int. Cl.
  *B62K 21/02* (2006.01)
  *B62K 23/02* (2006.01)
  *B62J 25/00* (2020.01)
  *B62K 3/00* (2006.01)
  *B62K 21/00* (2006.01)
  *B62J 43/00* (2020.01)
  *B62K 21/12* (2006.01)

(52) U.S. Cl.
  CPC .............. *B62K 21/00* (2013.01); *B62K 21/02* (2013.01); *B62K 23/02* (2013.01); *B62J 43/00* (2020.02); *B62K 21/12* (2013.01); *B62K 2204/00* (2013.01)

(56) References Cited

U.S. PATENT DOCUMENTS

| | | | | |
|---|---|---|---|---|
| 3,647,241 | A * | 3/1972 | Huyssen | B62M 1/00 |
| | | | | 280/221 |
| 4,555,122 | A * | 11/1985 | Harvey | B62K 21/00 |
| | | | | 280/87.041 |
| 5,954,349 | A | 9/1999 | Ruetzel | |
| 6,102,420 | A * | 8/2000 | Hoeksta | B62K 21/00 |
| | | | | 280/267 |
| 7,249,774 | B1 | 7/2007 | Tyler | |
| 10,407,117 | B2 * | 9/2019 | Allais | B62J 25/00 |
| 2017/0361893 | A1 * | 12/2017 | Lee | B62K 15/008 |

* cited by examiner

BICYCLE

CROSS REFERENCE TO RELATED APPLICATIONS

This application is the US-national stage of PCT application PCT/EP2017/000232 filed 17 Feb. 2017 and claiming the priority of German patent application 102016001843.7 itself filed 18 Feb. 2016.

FIELD OF THE INVENTION

The invention relates to a two-wheel vehicle having a frame comprising a front tube defining a front steering axis and on which are rotatably mounted a front fork stem rotationally supporting a front wheel and a steering arm carrying a handlebar, and a rear tube defining a rear steering axis and on which a rear fork stem is rotatably mounted with a rear fork receiving a rear wheel, with the rear fork stem being connected to the front fork stem by a coupling and being rotatable in dependence on the pivot angle of the front fork stem.

BACKGROUND OF THE INVENTION

Two-wheel vehicles with successively arranged wheels, such as scooters or two-wheel vehicles, usually have a steering arm with a handlebar that acts exclusively on the front wheel and is steered by a rider's hands. Since these two-wheel vehicles have only one steering arm, the turning circle of such a two-wheel vehicle during conventional use corresponds to at least twice the wheelbase of the two-wheel vehicle. When driving around an obstacle, the rear wheel of such a two-wheel vehicle does not follow the track of the front wheel, so the maneuverability of a typical two-wheel vehicle is substantially limited.

It is known from German patent 197 24 360 [U.S. Pat. No. 5,954,349] that the maneuverability of a scooter having two wheels one behind the other can be significantly improved by a steerable rear wheel. This patent document describes a two-wheeled scooter whose frame has two head tubes, each with a pivotable fork for the front and rear wheel, with a front fork actuated by a handlebar converting the steering deflection of the front wheel via a connection assembly to a steering deflection of the rear wheel.

A pulley is secured to each of the forks, with the pulleys being interconnected by a steel cable such that, when a steering movement of the front axle is performed, a steering movement occurs in the opposite direction. Since the rear fork can be rotated by a coupling formed by a cable pull as a function of the angle of pivoting of the front fork stem, a scooter is provided that offers agile and controlled handling while ensuring maximally precise tracking. The head tubes in which the forks are rotatably mounted are inclined at an acute angle to the vertical, so that the scooter still has safe directional stability despite its agile handling. Since the steering arm with the handlebar at its upper end has the same inclination as the front steering axle and the steering arm even coaxially surrounds the front steering axle, the inclination of the front steering axis in relation to the vertical axis cannot be further increased, since the steering arm otherwise covers the footprint of the deck, leaving no more space for the user. The intersection of the steering axes is thus very far above the head of a rider.

U.S. Pat. No. 3,620,547 also discloses a scooter whose frame has two head tubes in each of which a fork is rotatably mounted, but with the front fork not being coupled with the rear fork. Instead of using the steering movement of the front fork, the pivoting of the rear fork is achieved by an inclination of a deck that is caused by a shift in the rider's weight. The independent deflection of the two forks results in a flexible control of the two-wheel vehicle; however, the directional stability of the two-wheel vehicle is complicated by the fact that any shift in the rider's weight is converted into a steering movement of the rear wheel.

OBJECT OF THE INVENTION

It is therefore the object of the invention to provide a two-wheeled vehicle that has a high level of maneuverability in a compact, robust, and maintenance-friendly construction, has accurate tracking, and enables rapid progress in curves.

SUMMARY OF THE INVENTION

The object is achieved according to the invention in that the front steering axis and the rear steering axis are inclined toward one another and intersect below the handlebar. Preferably, the intersection of the front steering axis with the rear steering axis is below the height of an average person.

Relative to the straight-ahead direction of travel of the two-wheel vehicle, the front steering axis is tilted backward and the rear steering axis is inclined forward. This inclination is seen here above the roadway on which the two-wheel vehicle is standing. The longitudinal axis of the two-wheel vehicle is defined parallel to a straight-ahead direction of travel of the two-wheel vehicle, with the forward and rearward direction being relative to the straight-ahead direction of travel. The transverse axis is oriented perpendicular to the longitudinal axis, and the direction for left and right also refers to the straight-ahead direction of travel of the two-wheel vehicle. During operation of the two-wheel vehicle, its wheels are typically in contact with a roadway. The points of the wheels at which there is typically contact during operation are referred to hereinafter as the roadway contact points of the front wheel and the rear wheel. The roadway contact points define the direction with respect to a vertical axis, with the roadway contact points of the two-wheel vehicle being at the bottom. In the following, height refers to spacing from the roadway contact points of the wheels.

Since the front steering axis is inclined rearward and not vertical, pivoting of the front fork stem results in tilting of the front wheel relative to the longitudinal axis of the frame and relative to the vertical. A steering deflection of the handlebar thus results in a camber, i.e. an angle between the wheel center plane and the vertical of the roadway.

The front fork stem is connected to the rear fork stem by a coupling that converts pivoting of the front fork stem into pivoting of the rear fork stem. Since the rear fork stem is inclined forward and not vertical, such pivoting causes the rear wheel to tilt with respect to the longitudinal axis of the frame and the vertical. According to the invention, the steering axes intersect below the handlebar, so that the inclination of the front steering axis and of the rear steering axis is very pronounced compared to conventional two-wheel vehicles. As a result, pivoting of the front fork stem caused by a steering movement of the handlebar leads to a pronounced tilting of the front wheel and the rear wheel with respect to the longitudinal axis of the frame and the vertical. A steering deflection thus results in a camber of the front wheel and of the rear wheel.

The pronounced mutually aligned inclination of the front and the rear steering axes according to the invention has the advantage that steering results in a pronounced tilting of the front wheel and of the rear wheel relative to the vertical or a camber. This leads to additional lateral force generation when cornering, so that curves with a small radius of curvature can be rolled through at a higher speed. The advantage of the two-wheel vehicle according to the invention thus lies in the fact that the high inclination of the steering axes enables agile cornering at high speed. Moreover, the radius of curvature is significantly reduced by the simultaneous steering of the front and rear wheels in the event of a steering deflection. The combination of a reduced turning circle and a tilting of the wheels relative to the vertical has the effect that the agility of the two-wheel vehicle is improved substantially compared to conventional two-wheel vehicles. In a preferred embodiment, the turning circle of the two-wheel vehicle according to the invention is smaller than 1 meter in diameter.

In a preferred embodiment of the invention, the intersection of the front steering axis with the rear steering axis has a height corresponding to 0.7 to 1.3 times the wheelbase between the front wheel and the rear wheel. A height of the intersection of the steering axes that is equal to the wheelbase of the front and rear wheels is especially preferred. Such an orientation of the steering axes has the effect that a steering deflection produces a camber that forms an optimal angle with respect to the wheelbase. As a result, maneuverability during cornering is advantageously improved.

An advantageous embodiment of the invention is characterized in that the front steering axis and the rear steering axis are inclined by an identical inclination angle, particularly with opposite directions of inclination relative to the vertical. The inclination of the steering axes relative to the vertical is preferably an angle in the range from 15 to 35°, with an inclination angle between 20 to 30° being more preferred and an angle of 25 to 28° being especially preferred. The angle included between the steering axes is preferably in the range from 30 to 70°, more preferably 40 to 60°, still more preferably 50 to 56°.

An identical inclination angle of the front steering axis and the rear steering axis has the effect that, with identical pivoting of the front and rear fork stems, identical tilting of the front wheel and of the rear wheel relative to the vertical is achieved.

This embodiment of the invention has the advantage that both the front and the rear wheels have the same inclination relative to the vertical and the longitudinal axis of the frame, so that both wheels have the same influence on the lateral force generation when cornering, thus enabling an agile driving style.

Another embodiment of the invention makes a provision that the steering arm is mounted on the fork stem so as to be angled toward the front wheel.

In this way, the handlebar attached to the upper end of the steering arm is offset toward the front relative to the frame, so that space is created above the frame and the coupling that can be advantageously occupied by the rider of the two-wheel vehicle.

The handles of the handlebar are located in front of the rear steering axis as seen by the rider in the direction of travel, particularly in the upwardly open angular range formed between the two steering axes above their intersection.

Preferably, the perpendicular spacing of the upper end of the steering arm from the rear steering axis is less than from the front steering axis. In particular, the perpendicular spacing is generally understood to mean the spacing between the upper end of the steering arm and the steering axis on an imaginary line perpendicular to the rear steering axis and preferably intersecting the upper end of the steering arm.

An especially preferred embodiment of the invention is that the perpendicular spacing of the upper end of the steering arm from the front steering axis is greater than the forearm length of an average person. A perpendicular spacing to the front steering axle that is greater than 30 cm, more preferably greater than 50 cm, is preferred.

Since the perpendicular spacing from the upper end of the steering arm to the front steering axis is greater than the forearm length, sufficient space is created above the frame for the rider. In addition, a perpendicular spacing that is greater than the average person's forearm length results in the rider being able to easily operate the handlebar and steer. As a result, the handlebar is also significantly guided around the rider's body while steering.

Advantageously, this embodiment of the invention enables ergonomic steering of the two-wheel vehicle according to the invention.

In a preferred embodiment of the invention, the upper end of the steering arm is near the rear steering axis. It is particularly preferred that the perpendicular spacing from the upper end of the steering arm to the rear steering axis be less than 20 cm, more preferably less than 10 cm.

This ensures that the handlebar is tilted relative to the steering axis of the frame and the vertical during steering, leaving the space above the frame open so that it can be occupied by the rider. In addition, the handlebar orbits around the rider during a steering movement, thus enabling ergonomic steering. Moreover, during a steering movement, the steering arm is tilted relative to the vertical and the longitudinal axis of the frame toward the steering deflection and carried along according to the inclination of the front wheel.

Advantageously, such an embodiment of the invention makes an ergonomic riding position available to the rider. In particular, the rider is guided into a leaning position by the handlebar during a steering movement, which causes a tilting of the handlebar relative to the longitudinal axis of the frame and the vertical. The rider is thus guided into the leaning position of the two-wheel vehicle while cornering, which advantageously has the consequence that the two-wheel vehicle is easy for the rider to steer when cornering at relatively high speeds.

In another embodiment of the invention the height of the upper end of the steering arm is 1.6 to 2.0 times greater than the wheelbase between the rear and front wheels. A 1.8-fold height is especially preferred. Such a choice of the height of the upper end of the steering arm causes the height of the two-wheel vehicle to be greater than the length of the two-wheel vehicle. The upper end of the steering arm is preferably the point at which the handlebar or its stem is attached to the steering arm. This advantageously enables a compact design in the longitudinal direction. In particular, the ratio between height and wheelbase also imparts a high level of maneuverability to the two-wheel vehicle. Another design variant is characterized in that a downwardly extended center axis of the steering arm intersects a line connecting a roadway contact point of the front wheel and a roadway contact point of the rear wheel, or the roadway surface plane, at a point that in the longitudinal direction has a maximum spacing of 15 cm, preferably a maximum of 10 cm, more preferably no more than 5 cm, to a vertical axis through the center of mass of the two-wheel vehicle or, even more preferably, at exactly the point at which this vertical axis intersects the connecting line/roadway surface plane.

The steering arm is preferably a rod that extends straight at least in some regions, preferably as a whole, with this straight region forming an angle of 125° to 155° with the front steering axis or the front tube that is open in the direction of travel. Preferably, the steering arm has a length of 50 to 70 cm between the attachment point of the handlebar or its stem and the intersection with the steering axis. More preferably, the steering arm is angled by the above-mentioned angle at a spacing of 4 cm to 8 cm measured from the upper end of the front tube from the direction of the steering axis.

An especially stable embodiment of the invention is characterized in that the ratio of the offset of the front wheel to the offset of the rear wheel is equal to the ratio of the rear wheel load to the front wheel load. Such a configuration of the offsets of the front and rear wheels has the effect of compensating for disturbance torques. Advantageously, this leads to stabler handling, especially when driving straight ahead.

In a particularly agile embodiment of the invention pivoting of the front fork stem is converted by the coupling into an opposite pivoting of the rear fork stem. It is especially preferred that the angle of pivoting of the fork stems have the same angle.

The inverse coupling of the pivoting of the front fork stem to the rear fork stem results in a turning radius with a steering movement that is smaller than in a two-wheel vehicle in which only one fork stem is steered. If the angle of the pivoting at the front fork stem is the same as at the rear fork stem, the minimum curve radius is achieved for steering.

The advantage of inverse coupling is therefore that a steering angle results in a minimum curve radius, thereby increasing the maneuverability of the two-wheel vehicle according to the invention substantially compared to conventional two-wheel vehicles. The maneuverability of the two-wheel vehicle according to the invention particularly is increased since the opposite pivoting of the rear and front wheels is combined with an identical tilting of the rear and front wheels relative to the vertical. It is thus possible to travel with a two-wheel vehicle through curves of very small radii with a strongly inclined position and thus at increased speed.

According to another embodiment of the invention the transmission ratio between the pivot angles of the front and rear stems is adjustable. In particular, this transmission ratio can be adjusted on the coupling, with the ratio of front wheel pivot angle to rear wheel pivot angle being preferably adjustable to 1:N, where N is less than 1. In an especially agile design variant, N is greater than 1.

In this way, the pivoting of the front fork stem is not converted 1:1 into pivoting of the rear fork stem. If N is less than 1, a steering movement results a turning radius that is greater than in a 1:1 conversion. If N is greater than 1, the curve radius is less for a steering movement than in the case of a 1:1 conversion of the pivot angle.

Advantageously, this has the effect that the maneuverability of the two-wheel vehicle can be adjusted, particularly at the coupling. This enables the rider to adjust the maneuverability of the two-wheel vehicle individually according to personal preferences.

An embodiment of the invention that is particularly suitable for novice riders is that the rear fork stem can be fixed in its rotatability relative to the rear tube, with the rear wheel being set particularly in the straight-ahead direction of travel.

Since the rear wheel is set in the straight-ahead direction, the curve radius and the inclined position of the two-wheel vehicle are limited when cornering.

This offers the advantage, in particular for novice riders, that they can become accustomed to the special handling characteristics of the two-wheel vehicle according to the invention gradually.

Another embodiment of the invention is characterized in that the coupling can be separated from at least one of the fork stems.

In this way, the coupling of the pivot angle between the front fork stem and the rear fork stem is interrupted, so that the steering movement of the front fork stem is not converted into pivoting of the rear fork stem.

Such an embodiment of the invention has the particular advantage that the rear fork stem is decoupled and follows the direction of travel of the front wheel. In this case, the pivoting of the rear fork stem can be influenced by the rider by varying the inclination of the rear frame section by shifting the center of mass. In addition, decoupling of the coupling is necessary when the rear fork stem is fixed in its rotatability relative to the rear tube in order to prevent fixation of the front fork stem and thus ensure the steerability of the two-wheel vehicle.

It is thus advantageously possible to influence not only the steering movement, but also the tolerance of the steering of the two-wheel vehicle through a shift in the rider's center of mass. Moreover, steerability of the two-wheel vehicle is made possible through fixation of the rear fork stem relative to the rear tube.

In another embodiment of the invention, the coupling comprises a damper that damps the transfer of the pivoting from the front to the rear fork stem.

In this way, the steering movement of the front fork stem is converted to pivoting of the rear fork stem with a delay, so that both the curve radius and inclined position of the two-wheel vehicle are reduced when cornering. Variable damping of the transfer of the pivoting advantageously enables the rider to customize the maneuverability of the two-wheel vehicle according to the invention.

In another embodiment of the invention the coupling between the front fork stem and the rear fork stem is formed by a gear assembly, a belt coupling, or a linkage. Through the embodiment of the coupling as a gear assembly, a belt coupling, or a linkage, mechanical coupling is achieved between the front fork stem and the rear fork stem. Mechanical coupling has the advantage that it is easy to implement and offers high robustness under stress.

A preferred embodiment of the invention is characterized in that the coupling is a linkage having a coupling rod, particularly of variable length, whose two ends are pivotally connected to the front and rear fork stems on different sides of the frame and at a spacing. The points at which the coupling rod is pivoted are preferably on lever arms, with the coupling rod being particularly oriented to the greatest possible extent at a right angle to the two lever arms that are mounted on the fork stem when riding straight ahead.

Since the two ends of the coupling rod are pivoted at different sides of the frame and at a spacing from the respective fork stems, an inverse pivoting of the rear fork stem is caused upon pivoting of the front fork stem. While traveling straight ahead, the coupling rod extends to the greatest possible extent at a right angle to the two lever arms in order to achieve a quantitatively identical steering angle at the rear fork stem in the event of a steering movement of the front fork stem in both directions. In particular, the adjustable length of the coupling rod enables variable adjustment of the linkage.

Such an embodiment of the coupling has the advantage that the steering movement of the front fork stem is converted into an opposite pivoting of the rear fork stem at an identical angle, thereby giving the two-wheel vehicle a high level of maneuverability. In addition, the use of a linkage as a coupling has the advantage that the coupling can be implemented in a particularly simple manner, and it also enables robust and space-saving coupling between the front and rear fork stems.

Another variant of the invention is characterized in that the coupling has two pivot joints, each at a different spacing from the respective steering axis, or with at least one being adjustable.

Due to the different spacing to the respective steering axis, the setting of a transmission ratio of the steering movement between the front and rear fork stems is performed at the linkage. The linkage according to the invention thus enables a steering movement of the front fork stem is not converted 1:1 into a steering movement of the rear fork stem.

This offers the advantage that the ratio of front wheel pivot angle to rear wheel pivot angle is adjustable, so that the maneuverability of the two-wheel vehicle can be adjusted.

According to a preferred embodiment of the invention, in at least one of the pivot joints the spacing to the steering axis can be changed. A variable spacing to the steering axis can be preferably achieved by fastening at least one pivot joint in a slot of a lever arm attached to the respective fork stem. It is also possible to provide a plurality of discrete mounting holes that are spaced apart from the steering axis instead of a continuous slot. At least one of the lever arms to which the respective pivot joint is attached can also be variable in length.

In this way, the transmission ratio between the front wheel steering axis and rear wheel steering axis is variably adjustable. The use of a slot in combination with a coupling rod whose length is adjustable advantageously enables a simple and robust design of a coupling with variable transmission ratio.

In another design variant of the invention, the coupling is formed by a servomotor particularly on the rear fork stem and that converts pivoting of the front fork stem into pivoting of the rear fork stem. Instead of an electric servomotor, in another embodiment a hydraulic, pneumatic, or magnetic coupling is used between the front and the rear fork stems.

The use of a servomotor enables the transmission ratio between the pivoting of the front fork stem and the rear fork stem to be variably adjusted electronically. A servomotor thus offers the advantage that the rider of the two-wheel vehicle can adjust the maneuverability in a simple and variable manner. What is more, the use of an electronically adjustable servomotor provides the ability to control the transmission depending on the speed of the two-wheel vehicle, thus enhancing safety while riding.

Another variant of the invention is characterized in that the diameter of the front wheel is greater than or equal to the diameter of the rear wheel. Preferably, the front wheel has a diameter in the range from 20 cm to 50 cm, and the rear wheel has a diameter of 10 cm to 40 cm. The larger front wheel has a positive effect on the handling characteristics of the two-wheel vehicle. In particular, a larger front wheel enables improved travel over obstacles and a more stable ride on uneven ground.

According to another preferred embodiment of the invention the front wheel has an electric drive that is especially preferably embodied as a wheel hub motor. The wheel hub motor preferably has an output of 150 watts to 1500 watts. The power is preferably adapted automatically or by the rider to the slope of the roadway, with the power being increased, for example, when ascending a hill.

Since the front wheel is electrically driven, the frame and the rear wheel are pulled by the front wheel, which advantageously results in an increase in understeer when cornering. The use of a wheel hub motor has the advantage of enabling the simple and compact implementation of an electric drive of the front wheel, with optimum acceleration and top speed of the two-wheel vehicle being achieved at an output in the range of 150 watts to 1500 watts.

In another design variant of the invention, the frame has a rechargeable battery and a controller for the electric drive of the front wheel. Preferably, the rechargeable battery and controller are integrated into the frame and mounted so as to be quickly exchangeable.

A compact design of the two-wheel vehicle can thus be achieved in which heavy components are mounted in close proximity to the frame, so that the center of mass of the two-wheel vehicle is located in the center.

Advantageously, a compact design is thereby made possible that provides sufficient space for the rider and also positively influences the handling characteristics.

In another variant of the invention a controller for the electric drive is mounted on the handlebar.

The electric drive on the handlebar enables the rider of the two-wheel vehicle to operate the electric drive without having to let go of the handlebar. One advantage of this design is therefore that the electric drive can be operated safely by the rider even when cornering and the speed and/or acceleration are adjusted appropriately. In a preferred variant of the invention, the controller can be used to specify a desired travel range. A computer in the controller can limit the power in this case—based on a map, for example—so that the travel range can be achieved. Furthermore, for example, that speed values, acceleration values, and/or speed profiles can be set via the controller or via a mobile terminal.

An especially preferred embodiment of the invention is characterized in that the frame has a footboard, with the footboard being preferably composed of two standing surfaces parallel next to one another relative to the straight-ahead direction of travel. According to the invention, the standing surfaces are particularly aligned such that a user's feet can be placed on both sides of the frame.

The rider of the two-wheel vehicle is thus provided with a standing surface on which he can stand while riding the two-wheel vehicle. The standing surfaces parallel next to one another relative to the straight-ahead direction of travel ensure that the rider is aligned with his upper body perpendicular to the direction of travel and is thus looking in the direction of travel. In addition, the adjacent standing surfaces enable lateral loading of the footboard, so that a rider can steer by shifting his center of mass.

Advantageously, a footprint is thus created for the rider in a simple manner, which also enables him to control the steering characteristics of the two-wheel vehicle by shifting his center of mass.

In one design variant, the footboard is retractable and, particularly in the retracted state, oriented at least partially perpendicular to the transverse axis of the frame. Since the footboard is retractable, the base of the two-wheel vehicle can be reduced into the plane defined by the longitudinal axis and the transverse axis of the frame. This enables the two-wheel vehicle according to the invention to be transported and/or stowed more easily.

Another embodiment is that the footboard has a plane that is below the front wheel hub and above the rear wheel hub. It is especially preferred that the rear wheel be at least partially between the standing surfaces, in which case the footboard has a rearwardly open recess in the pivoting range of the rear wheel.

Since the footboard plane is below the front wheel hub, the center of mass of the two-wheel vehicle with rider is shifted downward relatively far. The at least partial arrangement of the rear wheel between the standing surfaces allows the rider to find footing in the rear region of the frame and thereby shift the center of mass toward the rear. The rear recess in the pivot range of the rear wheel allows the rear wheel to pivot when cornering without the footboard getting in the way.

Such a design of the footboard has the advantage that the handling characteristics of the two-wheel vehicle are improved by a low center of mass. What is more, the arrangement of the rear wheel between the footboard surfaces enables the rider to influence the traveling movement of the vehicle, thereby increasing maneuverability when cornering.

In one embodiment of the invention, the footboard is rotatably mounted on at least one pivot point in the straight-ahead direction of travel. This decouples the rider's movement from the movement of the two-wheel vehicle, which has the effect that the footboard becomes orthogonal to the brake vector during braking, shifting the center of mass of the rider and two-wheel vehicle further rearward. This has the advantage that the front wheel is relieved during braking, thereby increasing the stability of the two-wheel vehicle during braking.

In a preferred embodiment of the invention, the frame has a saddle and footrests. The rider of the two-wheel vehicle is thus given an opportunity to sit down while riding and thus rest.

In a preferred embodiment of the invention, the spacing between the axes of the front wheel and the rear wheel in the longitudinal direction is 500 mm to 800 mm, preferably 600 mm to 700 mm. In particular, the wheelbase between the front wheel and the rear wheel corresponds to the height of the intersection of the front and rear steering axes.

Such a short wheelbase has the effect of providing greater agility compared to conventional two-wheel vehicles, particularly in combination with the mutually inclined steering axes and the coupled fork stems.

BRIEF DESCRIPTION OF THE DRAWING

The invention will be explained in greater detail below with reference to an embodiment with the aid of the figures. In the drawing.

SPECIFIC DESCRIPTION OF THE INVENTION

Figure 1:
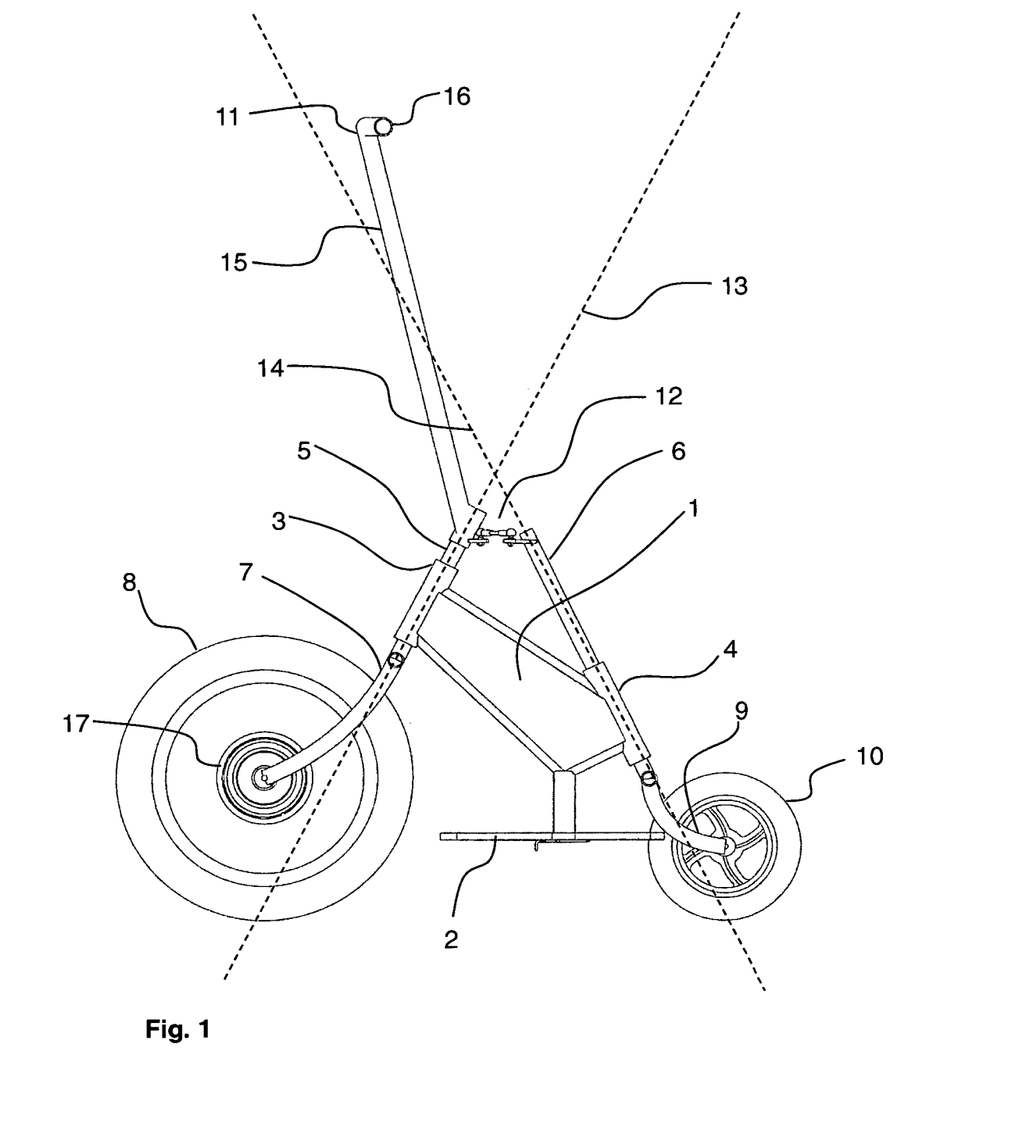
FIG. 1 is a side elevation of the two-wheel vehicle.

FIG. 1 is a side elevation of an embodiment of the invention in which a frame 1 has a front tube 3 and a rear tube 4. The front tube 3 rotatably supports a front fork stem 5 with a front fork 7 rotationally supporting a front wheel 8 and a steering arm 15 on which a handlebar 16 is arranged.

In addition, the front tube 3 defines a front steering axis 13. The rear tube 4 rotatably supports a rear fork stem 6 with a rear fork 9 rotationally supporting a rear wheel 10, and defines a rear steering axis 14. The steering axes 13 and 14 are preferably the center axis of the front and rear tubes 3 and 4.

The front fork stem 5 is connected to the rear fork stem 6 by a coupling 12 for pivoting of the rear fork stem 6 in dependence on the pivot angle of the front fork stem 5. The front steering axis 13 and the rear steering axis 14 are inclined toward one another and intersect below the handlebar 16. Relative to a straight-ahead direction of travel, the front steering axis 13 is inclined rearward, whereas the rear steering axis 14 is inclined forward. The inclination angles are such that both steering axes intersect below the handlebar 16. The point of intersection is preferably below the height of an average person. In the illustrated embodiment of the invention, the height of the intersection corresponds to 0.7 to 1.3 times the wheelbase between the front wheel 8 and the rear wheel 10.

Such a pronounced inclination of the front steering axis 13 causes the front wheel 8 to be tilted upon pivoting of the front fork stem 5 in the longitudinal direction of the frame 1 and relative to the vertical. When cornering, this results in a wheel camber that generates greater lateral forces, making it possible to drive through curves at high speed. The pronounced forward inclination of the rear steering axis 14 causes the rear wheel 10 to also be tilted relative to the vertical when cornering. The wheel camber produced in this way generates greater lateral forces on the rear wheel 10.

Figure 2:
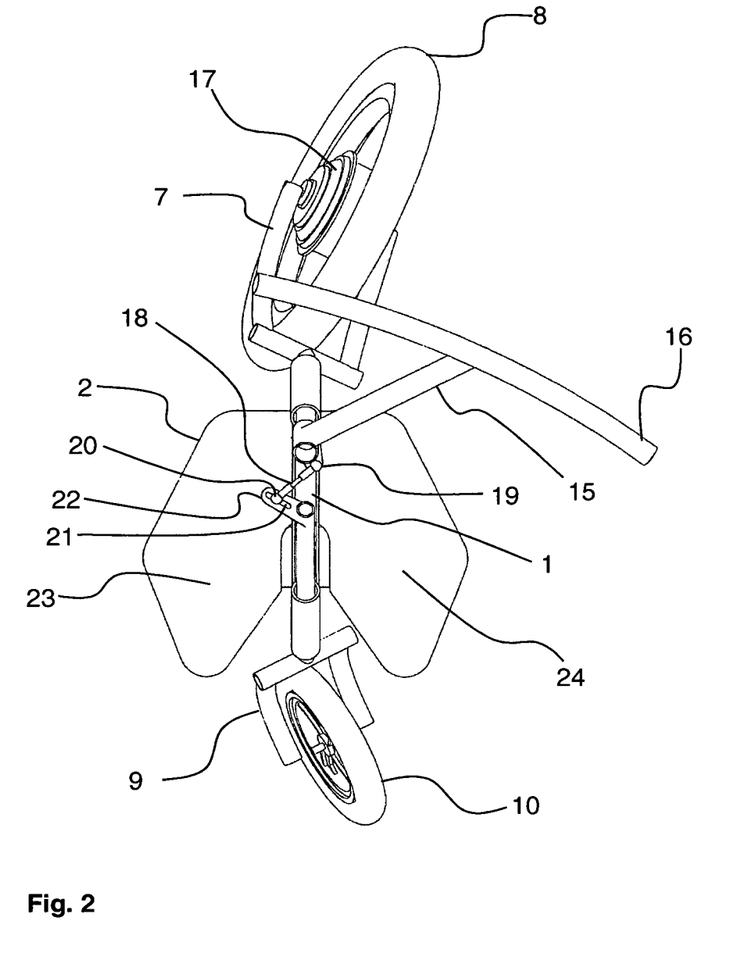
FIG. 2 is a plan view of the two-wheel vehicle with its steering angle to the right relative to the straight-ahead direction of travel.

In the plan view of FIG. 2, the two-wheel vehicle is shown with the handlebar 16 turned to the right with respect to the longitudinal axis of the frame 1. A steering movement of the handlebar 16 results in pivoting of the front fork stem 5 and in a tilting of the front wheel 8 relative to the longitudinal axis of the frame 1, as well as in a tilting relative to the vertical that, in this illustration, is oriented perpendicular to the page. The coupling of the pivoting of the front fork stem 5 with the rear fork stem 6 causes the rear wheel 10 to be tilted relative to the longitudinal axis of the frame 1 and the vertical. When cornering, the wheel center planes of front wheel 8 and rear wheel 10 are tilted toward the center of the curve arc, so that a curve can be taken at a higher speed due to the greater lateral force.

As shown in FIG. 1, the front steering axis 13 and the rear steering axis 14 are inclined by an identical angle relative to the vertical. An inclination angle in the range of 15° to 35° is preferred, and it has been found that an inclination angle in the range of 20° to 30° is especially preferred.

The steering arm 15 mounted on the front fork stem 5 is angled toward the front wheel 8. Free space is thus created above the frame 1 that can be occupied by the rider's upper body. In a particularly ergonomic embodiment, the perpendicular spacing from the upper end of the steering arm 11 to the front steering axis 13 is greater than the forearm length of an average person. This enables the rider to steer the two-wheel vehicle comfortably.

As shown in FIG. 1, the upper end of the steering arm 11 is located near the rear steering axis 14. Such an arrangement of the steering arm 15 ensures that the steering arm 15 orbits around the rider in the steering direction when steering (see FIG. 2). As a result, the rider immediately follows the inclined position of the two-wheel vehicle and turns into the curve when cornering, thus increasing the maneuverability of the two-wheel vehicle. As shown in FIG. 1, the upper end of the steering arm 11 has a height that is preferably 1.6 to 2.0 times greater than the wheelbase between the front wheel 8 and rear 10.

In a design variant that is not illustrated, the intersection of a downwardly extended center axis of the steering arm 15 with the roadway, on the one hand, and of the connecting lines between a roadway contact point of the front wheel 8 with a roadway contact point of the rear wheel 10, on the other hand, is below the overall center of mass of the two-wheel vehicle. In another especially stable unillustrated embodiment of the invention the ratio of the offset of the front wheel to the offset of the rear wheel is equal to the ratio of the rear wheel load to the front wheel load. Disturbance torques are compensated for, which advantageously results in stabler handling, particularly when driving straight ahead.

What is more, the agility of the two-wheel vehicle is increased since pivoting of the front fork stem 5 is converted by the coupling 12 into an opposite pivoting of the rear fork stem 6. For increased maneuverability, the fork stems 5 and 6 move angularly oppositely. In this case, a steering deflection of the front fork stem 5 results in the same steering deflection of the rear fork stem 6 and thus to a significantly reduced radius of curvature of the two-wheel vehicle.

In one variant of the invention that is not shown, the rear fork stem 6 is detected in its pivoting relative to the rear tube 4, with the rear wheel 10 locked in the straight-ahead direction of travel. Locking the rear fork stem 6 has the advantage of limiting the maneuverability of the two-wheel vehicle so that novice riders in particular are able to familiarize themselves with the handling of the two-wheel vehicle.

In the case of a locked rear fork stem, it is advantageous to disconnect the coupling 12 from at least one of the fork stems 5 or 6 in order to maintain the rotatability of the front fork stem 5. A separation of the coupling 12 can also be used to control the rear fork stem 6 by shifting the center of mass by the rider, in which case the rear fork shaft tube is not locked to the frame 1.

In an unillustrated embodiment, the coupling 12 has a damper that damps the transmission of pivoting motion between the rear fork stem 6 and the front fork stem 5. A variable adjustment of the damping makes variable adjustment of the maneuverability of the two-wheel vehicle possible according to the rider's individual needs.

FIGS. 1 and 2 show a coupling 12 that comprises a coupling rod 18 whose two ends are pivoted on the front and rear fork stems 6 and 5 on different sides of the frame 1 and at transverse a spacing. The coupling rod 18 is preferably secured between two pivot joints 19 and 20 that are ball joints in one particularly robust and easy-to-implement variant.

In at least one of the pivot joints 19 and 20, the spacing to the longitudinal axis of the frame 1 can be changed, in which case the change in the spacing is particularly achieved by fixing a pivot joint 20 in a slot 21 that is integrated into a lever arm 22.

In an unillustrated embodiment of the invention, the coupling is formed by a servomotor mounted particularly on the rear fork stem 6. The servomotor, on pivoting of the first fork stem 5, pivots of the second fork stem 6. The use of a servomotor offers the advantage that the transmission ratio is electronically adjustable, which makes it easy for the rider to adjust maneuverability. In this embodiment of the invention, maneuverability can for example also be controlled in dependence on the speed of the two-wheel vehicle, thus enhancing safety.

As shown in FIG. 1, one embodiment of the invention has a front wheel 8 that is larger than the rear wheel 10. The front wheel 8 also has an electric drive 17 that is preferably a wheel hub motor. Through the use of a larger front wheel 8 in combination with a front wheel drive 17, the handling characteristics of the two-wheel vehicle are positively influenced. For example, the larger front wheel 8 allows one to roll over obstacles. In addition, since the two-wheel vehicle is pulled by the front wheel 8, cornering stability is improved, since the frame 1 and the rear wheel 10 are pulled by the front wheel 8.

In an unillustrated embodiment of the invention, the frame 1 comprises a rechargeable battery and a controller for the electric drive 17. Through the arrangement of a rechargeable battery in a controller on or in frame 1 of the two-wheel vehicle, a particularly compact design of the two-wheel vehicle is achieved in which the center of mass is near the frame 1, and the maneuverability of the two-wheel vehicle is increased.

Another design variant of the invention that is not shown is that a controller for the electric drive is mounted on the handlebar 16. The controller on the handlebar 16 enables a rider to control the speed or the power of the two-wheel vehicle directly and to vary them continuously when cornering.

As shown in the plan view of FIG. 2, the frame 1 has a footboard 2 composed of two standing surfaces 23 and 24 parallel next to one another relative to the straight-ahead direction of travel. The standing surfaces 23 and 24 are particularly dimensioned such that the rider's feet can be placed parallel next to one another on both sides of the frame. Such a configuration of the standing surfaces 23 and 24 gives the rider secure footing, with the rider's upper body being oriented perpendicular to the straight-ahead direction of travel.

In the design variant of FIG. 2, the footboard plane of the footboard 2 is below the front wheel hub and above the rear wheel hub, so that the center of mass of the two-wheel vehicle with the rider standing thereon is as low as possible. This enhances the maneuverability of the two-wheel vehicle. What is more, as shown in FIG. 2, the rear wheel 10 is at least partially between the standing surfaces 23 and 24, with the footboard 2 particularly having a rear recess in the pivot range of the rear wheel 10.

One unillustrated embodiment of the invention is characterized in that the footboard 2 can be folded up and, particularly in the folded-up state, is oriented at least partially perpendicular to the transverse axis of the frame 1. The footprint of the two-wheel vehicle can thus be reduced, which facilitates transporting and/or the stowage of the two-wheel vehicle.

A variant of the invention that is not illustrated is that the frame 1 has a saddle and footrests so that the rider can sit down while riding. This prevents rider fatigue during longer trips.

As indicated in FIGS. 1 and 2, the two-wheel vehicle according to the invention has a very short wheelbase between the front wheel 8 and the rear wheel 10, with a value between 500 mm and 800 mm being preferred and a value between 600 mm and 700 mm being especially preferred.

The pronounced inclination of the steering axes 13 and 14 relative to each other, the inverse coupling of the fork stems 5 and 6, the low position of the footboard 2, and the short spacing between the front wheel 8 and rear wheel 10 enable a compact two-wheel vehicle to be realized that is particularly agile when cornering.

The invention claimed is:

1. A two-wheel vehicle comprising:
    a front tube defining a front steering axis;
    a front fork stem having a front fork rotatable about the front steering axis on the front tube;
    a front wheel rotatable about a front wheel axis on the fork;
    a steering arm carrying a handlebar fixed on the front fork stem;
    a rear tube defining a rear steering axis and forming with the front tube a frame;
    a rear fork stem having a rear fork rotatable about the rear steering axis on the rear tube;
    a rear wheel rotatable about a rear wheel axis on the rear fork; and
    a coupling connecting the rear fork stem to the front fork stem for synchronous and opposite pivoting of the front and rear fork stems about the respective axes, the front steering axis and the rear steering axis being inclined toward one another and intersecting below the handlebar.

2. The two-wheel vehicle according to claim 1, wherein an intersection of the front steering axis with the rear steering axis has a height of 0.7 to 1.3 times a wheelbase between the front wheel and the rear wheel.

3. The two-wheel vehicle according to claim 1, wherein the front steering axis and the rear steering axis are inclined by an identical angle relative to a true vertical.

4. The two-wheel vehicle according to claim 1, wherein the steering arm is on an upper end of the front fork stem and angled toward the front wheel.

5. The two-wheel vehicle according to claim 1, wherein a perpendicular spacing from an upper end of the steering arm to the rear steering axis is less than to the front steering axis.

6. The two-wheel vehicle according to claim 1, wherein a perpendicular spacing from an upper end of the steering arm to the front steering axis is greater than 50 cm.

7. The two-wheel vehicle according to claim 1, wherein an upper end of the steering arm is near the rear steering axis and a perpendicular spacing from the upper end of the steering arm to the rear steering axis is less than 10 cm.

8. The two-wheel vehicle according to claim 1, wherein an upper end of the steering arm has a height that is 1.6 times to 2 times greater than a wheelbase between the front wheel and the rear wheel.

9. The two-wheel vehicle according to claim 1, wherein a downwardly extended center axis of the steering arm intersects a line connecting a roadway contact point of the front wheel and a roadway contact point of the rear wheel at a point that, in a longitudinal travel direction, has a maximum spacing of 15 cm to a vertical axis through a center of mass of the two-wheel vehicle.

10. The two-wheel vehicle according to claim 1, wherein pivoting of the front fork stem through a predetermined angle is converted by the coupling into an opposite pivoting of the rear fork stem with an angle that is the same as the predetermined angle.

11. The two-wheel vehicle according to claim 1, wherein a transmission ratio between the pivot angles is adjustable at the coupling and the ratio of front wheel pivot angle to rear wheel pivot angle is adjustable to 1:N, where N is less than or equal to 1.

12. The two-wheel vehicle according to claim 1, wherein the rear fork stem is pivotally fixable in the rear tube in a straight-ahead direction of travel of the rear wheel.

13. The two-wheel vehicle according to claim 1, wherein the coupling is disconnectable from at least one of the fork stems.

14. The two-wheel vehicle according to claim 1, wherein a horizontal axial spacing between the axes of the front wheel and the rear wheel is 500 to 800 mm.

15. The two-wheel vehicle according to claim 1, wherein the coupling between the fork stem and the rear fork stem is a gear assembly, a belt coupling, or a linkage.

16. The two-wheel vehicle according to claim 1, wherein the coupling is a linkage having a coupling rod of variable length, whose two ends are pivotally connected to the respective fork stems on different sides of the frame and at a spacing.

17. The two-wheel vehicle according to claim 1, wherein the coupling has front and rear pivot joints, each at a different spacing from the respective steering axis.

18. The two-wheel vehicle according to claim 17, wherein the spacing to the steering axis can be changed in at least one of the pivot joints.

19. The two-wheel vehicle according to claim 1, wherein the frame has a footboard composed of two standing surfaces that are mounted parallel next to one another relative to a straight-ahead direction of travel.

20. The two-wheel vehicle according to claim 19, wherein the footboard has a footboard plane that is below a front wheel hub and above a rear wheel hub, with the rear wheel being at least partially between the standing surfaces, and with the footboard having a rear recess in a pivot range of the rear wheel.

21. The two-wheel vehicle according to claim 1, wherein the front wheel or the rear wheel has an electric drive that is preferably a wheel hub motor.

22. The two-wheel vehicle according to claim 21, wherein the frame has a rechargeable battery and a controller for the electric drive.

23. The two-wheel vehicle according to claim 1, wherein a diameter of the front wheel is greater than or equal to a diameter of the rear wheel.

* * * * *